US006386373B1

(12) United States Patent
Jourdier et al.

(10) Patent No.: US 6,386,373 B1
(45) Date of Patent: May 14, 2002

(54) PROCESS FOR MAKING SILICA POWDER AND USE OF SUCH POWDER IN THE MANUFACTURE OF AN OPTICAL FIBER PREFORM

(75) Inventors: Pierryle Jourdier, Paris; Christelle Lavallade, Courdimanche; Jean-Florent Campion, Conflans St Honorine; Philippe Oskeritsian, Rueil Malmaison; Jean-Maxime Saugrain, Le Vesinet, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/523,498

(22) Filed: Mar. 10, 2000

(51) Int. Cl.$^7$ .............................. B07B 1/00; C03B 37/16
(52) U.S. Cl. ......................... 209/11; 209/235; 65/391; 65/395; 65/397; 423/338
(58) Field of Search .............................. 209/3, 4, 7, 11, 209/233, 235; 65/391, 395, 397; 423/335, 338; 501/12

(56) References Cited

U.S. PATENT DOCUMENTS 4,414,012 A * 11/1983 Suto et al. .................... 65/18.2
5,912,397 A * 6/1999 Baik et al. ................. 65/395 X
6,047,568 A * 4/2000 Campion ...................... 65/395
6,071,487 A * 6/2000 Campion et al. ............ 423/338
6,127,295 A * 10/2000 Yoon et al. ................... 501/12

FOREIGN PATENT DOCUMENTS

| EP | 0 271 281 A2 | 6/1988 |
| EP | 578 553 A1 | 1/1994 |

* cited by examiner

Primary Examiner—Tuan N. Nguyen
(74) Attorney, Agent, or Firm—Sughrue Mion, PLLC

(57) ABSTRACT

A process is described for making silica powder by a sol-gel process whereby an aqueous suspension is made of a silica-based raw material which includes particles containing chlorine, the pH of the suspension is adjusted to a value from 3 to 4.5 if necessary, the suspension is gelled, the gel obtained is dried and the dried gel is fractionated into silica granules. The silica-based raw material preferably includes particles containing chlorine having a specific surface area less than 80 $m^2/g$ and less than 5 wt. % relative to the total quantity of particles containing chlorine of silica particles having a specific surface area from 150 $m^2/g$ to 300 $m^2/g$. The use of such powder to manufacture an optical fiber preform is also described.

17 Claims, No Drawings

PROCESS FOR MAKING SILICA POWDER AND USE OF SUCH POWDER IN THE MANUFACTURE OF AN OPTICAL FIBER PREFORM

BACKGROUND OF THE INVENTION

1. Field of the Invention

The present invention relates to a process for making silica powder by a sol-gel process wherein an aqueous suspension of a silica-based raw material is made, said suspension is gelled, the gel obtained is dried and the dried gel is fractionated into powder made up of silica granules. It also relates to the use of such powder to manufacture an optical fiber preform.

2. Description of the Prior Art

One process for making silica powder is disclosed in French patent 2 693 451. In the examples given therein, a suspension is made from particles essentially free of chlorine. Silica particles are made by oxidation of silicon chloride $SiCl_4$, generally in the presence of hydrogen and oxygen. The particles obtained directly by such a process are referred to as "acid" because they contain chlorine in the form of hydrochloric acid. Such particles are corrosive. The particles then generally undergo a chlorine desorption process yielding "neutralized" particles. The "neutralized" particles are still acid particles as, in the case of a 4 wt. % aqueous dispersion of particles having a specific surface area equal to approximately 50 $m^2/g$, their pH is estimated at from 3.8 to 4.8, for example. However, they are much less acid than before the chlorine desorption treatment. The cost of manufacturing such silica particles is therefore high. One example of "neutralized" particles is Aerosil OX 50 silica soot from DEGUSSA, consisting mainly of particles with a specific surface area of 50 $m^2/g$.

The object of the process according to the invention is partly or totally to avoid the use of such essentially chlorine-free particles.

SUMMARY OF THE INVENTION

To this end, the process according to the invention is a process for making silica powder by a sol-gel process wherein an aqueous suspension of a silica-based raw material which includes particles containing chlorine is made, the suspension is gelled, the gel obtained is dried and the dried gel is fractionated into powder made up of silica granules.

Surprisingly, particles containing chlorine can also be used to make silica powder suitable for manufacturing optical fiber preforms.

Because they have not undergone any chlorine desorption treatment, particles containing chlorine have the advantage that their cost is very much lower than particles which are essentially free of chlorine.

In one embodiment of the invention, the process according to the invention includes screening the silica granules obtained by fractionation to obtain powder made up of granules having sizes from a lower limit from 75 $\mu$m to 120 $\mu$m to an upper limit from 280 $\mu$m to 550 $\mu$m. The size of a granule is defined by the greatest length of the granule, regardless of its shape. It is principally measured by screening.

The silica particles containing chlorine used in the process according to the invention generally have a specific surface area not greater than 80 $m^2/g$. In the case of screening, using starting particles of the above kind has the advantage of leading to a good process yield in terms of granules. The yield in terms of granules is defined as the percentage by weight of granules after screening to the proportion of silica contained in the raw material in suspension.

In a preferred embodiment of the invention the silica-based raw material includes particles containing chlorine having a specific surface area less than or equal to 80 $m^2/g$ and less than 5 wt. %, preferably from 0.5 wt. % to 1.5 wt. %, relative to the total quantity of said particles containing chlorine of silica particles having a specific surface area from 150 $m^2/g$ to 300 $m^2/g$. Surprisingly, this increases the viscosity of the suspension and the yield in terms of granules, which generally have an approximate size from 100 $\mu$m to 500 $\mu$m or even from 100 $\mu$m to 300 $\mu$m. In particular, screening is improved because there is advantageously little clogging of the screen, essentially because of the reduced content of granules with a size less than about 100 $\mu$m, which can tend to clump together.

The silica particles with a specific surface area from 150 $m^2/g$ to 300 $m^2/g$ preferably contain chlorine. However, such particles can instead be essentially free of chlorine because their concentration in the suspension is low and so the cost of the process according to the invention remains highly advantageous.

In another embodiment of the process according to the invention, in which screening is performed as previously described, the raw material based on silica further includes silica granules having a size greater than the upper screening limit. There are therefore at least two silica granule fabrication steps as previously defined, the last fabrication step being such that the silica-based raw material additionally includes silica granules rejected by screening in at least one of the preceding fabrication steps. As described in U.S. patent application Ser. No. 09/116,337, it is possible in this way to recycle non-standard silica granules (for example 100 $\mu$m to 500 $\mu$m granules) rejected by screening by adding them to the silica-based raw material. In this case it is generally preferable to add to the initial suspension the non-standard granules fraction with a size greater than the upper screening limit, which is 500 $\mu$m, for example, but which can instead be 300 $\mu$m for screening from about 100 $\mu$m to about 300 $\mu$m, for example. Surprisingly, this embodiment produces a suspension of adequate viscosity, which advantageously leads to an improved screening yield in terms of granules, which generally have an approximate size from 100 $\mu$m to 500 $\mu$m or even from 100 $\mu$m to 300 $\mu$m.

In one embodiment of the process according to the invention the pH of the suspension is adjusted to a value between 3 and 4.5. This advantageously limits corrosion of the reactor in which the suspension is prepared.

The dry gel is fractionated into silica granules generally having a diameter from a few $\mu$m to 2 mm, as is well known to the skilled person. The granules generally have an apparent density in the order 0.5 $g/cm^3$ to 0.6 $g/cm^3$. On an industrial scale, such fractionation is generally effected by means of a screw-type granulator.

The acid particles are generally taken up into solution in an amount from 30 wt. % to 76 wt. %, for example equal to 70 wt. %.

The invention also relates to using a powder made by the process previously described to manufacture an optical fiber preform. The granulated powder obtained by the process according to the invention can be used directly or after densification in a plasma torch during plasma surfacing of a primary preform.

In a preferred embodiment of the invention, the powder made by the process described above is screened before it is used to manufacture an optical fiber preform. The screened powder is then generally made up of granules with a size ranging from a lower limit from 75 μm to 120 μm to an upper limit from 280 μm to 550 μm.

As described in French patent 2 693 451, such surfacing can be carried out in the presence of a fluorine-containing gas and it is also possible to add at least one dopant to the silica granules obtained in this way.

As described in French patent 2 693 451 it is also possible to apply a densifying heat treatment to the silica granules and to eliminate some of the OH groups by an intermediate phase of the heat treatment.

Other features and advantages of the present invention will become apparent in the course of the following description of examples of use of the invention, which are given by way of illustrative and non-limiting example.

EXAMPLES

Example 1 (According to the Invention)

A suspension was made containing 50 kg of silica soot containing chlorine and having a specific surface area of 50 m$^2$/g to 60 m$^2$/g in 20 l of deionized water. The pH was approximately 2.5 and was adjusted to 4 by adding a basic NH3 solution. Such adjustment has the advantage of limiting or even eliminating corrosion of the reactor by the soot.

A gel was obtained by heating in a microwave vacuum reactor, followed by drying of the gel, the temperature of the water in the double jacket for carrying out such heating being approximately 65° C. The gel dried by microwaving in a vacuum was then fractionated using a screw rotating continuously at a speed from approximately 40 rpm to approximately 50 rpm. Silica granules with a density of 0.5 g/cm$^3$ to 0.6 g/cm$^3$ and with a diameter from a few μm to 1000 μm were obtained, the range of particle sizes being centered at around 100 μm and 50 wt. % of the particles having a size less than 100 μm.

The granulated powder obtained was screened with an approximately 100 μm to 300 μm mesh, after which the screened powder was densified at 1400° C. for 9 hours in a swept helium atmosphere at atmospheric pressure. The densified screened powder was fed into a plasma torch in a plasma deposition process to spray and fuse silica powder onto a primary preform. The flowrate was from 900 g/h to 4000 g/h and the spraying process was applied to a primary preform which had a diameter of 21 mm, which was to be increased to 63 mm.

Example 2 (According to the Invention)

600 g of DEGUSSA Aerosil 200 silica soot having a specific surface equal to 200 m$^2$/g were dispersed in 20 l of deionized water. This type of silica soot is practically free of chlorine. 50 kg of "acid" silica soot identical to that from example 1 were then added. Silica granules were made by the some process as in example 1. Granules were finally obtained having a size between a few μm and 1000 μm, in a range centered around 300 μm. Only approximately 15% of the particles had a size less than 100 μm.

Example 3 (Comparative)

A suspension was prepared containing 50 kg of DEGUSSA Aerosil 50 silica soot having a specific surface area of 50 m$^2$/g in 37 l of deionized water. This kind of silica soot is practically free of chlorine. Silica granules were made by the same process as in example 1. Granules were finally obtained with a size from a few μm to 1000 μm, centered around 300 μm. Only 20% of the particles had a size less than 100 μm.

Example 4 (According to the Invention)

As explained in U.S. patent application Ser. No. 09/116, 337, some of the granules rejected by screening can be recycled. Granules were made as in example 1, and then screened at a mesh from about 100 μm to about 300 μm by the combined use of two superposed screens, a 100 μm screen and a 300 μm screen. Approximately 20 wt. % of granules having sizes in the range from 100 μm to 300 μm and 30 wt. % having sizes greater than 300 μm were obtained.

After several successive fabrication steps identical to the fabrication step described above, it was possible to prepare a suspension using recycled granules. A suspension was prepared containing 20 kg of "acid" silica soot identical to that of example 1, 200 g of "neutralized" DEGUSSA Aerosil 200 silica soot having a specific surface area equal to 200 m$^2$/g, and 40 kg of granules with a size greater than 300 μm, in 24 l of deionized water. Silica granules were made by the same process as in example 1. The results were comparable with those of the preceding example 2. Granules were finally obtained having sizes from a few μm to 1000 μm, centered around 300 μm. Only approximately 15% of the particles had sizes less than 100 μm.

What is claimed:

1. A method of manufacturing a silica powder by a sol-gel technique, wherein the method comprises:

forming an aqueous suspension of a silica-based raw material which includes essentially particles containing chlorine;

gelling the suspension;

drying the resulting gel; and fractionating the dried gel into powder made up of silica granules.

2. The method claimed in claim 1, wherein the method further includes screening the silica granules obtained by fractionation to obtain powder made up of granules having sizes from a lower limit of 75 μm to an upper limit of 550 μm.

3. The method claimed in claim 2, wherein said silica-based raw material includes silica granules having a size greater than the upper screening limit.

4. The method claimed in claim 1, wherein said particles containing chlorine of said silica-based raw material include particles having a specific surface area less than 80 m$^2$/g.

5. The method claimed in claim 4, wherein said silica-based raw material also includes less than 5 wt %, relative to the total quantity of said particles containing chlorine, of silica particles having a specific surface area from 150 m$^2$/g to 300 m$^2$/g.

6. The method claimed in claim 5, wherein the proportion of silica particles having a specific surface area from 150 m$^2$/g to 300 m$^2$/g is from 0.5 wt % to 1.5 wt % relative to the quantity of said particles containing chlorine.

7. The method claimed in claim 1, wherein the pH of said suspension is adjusted to a value from 3 to 4.5.

8. A method of manufacturing an optical fiber preform, wherein the method comprises:

applying a silica powder manufactured by the method as claimed in claim 1 to a primary preform.

9. The method claimed in claim 8, wherein said silica powder is screened before it is used to make an optical fiber preform.

10. The method claimed in claim 9, wherein the screened silica powder is made up of granules having sizes from a lower limit of 75 μm to an upper limit of 550 μm.

11. The method claimed in claim 2, wherein the silica granules obtained by fractionation are screened to obtain powder made up of granules having sizes from a lower limit of 75 μm to an upper limit of 280 μm.

12. The method claimed in claim 2, wherein the silica granules obtained by fractionation are screened to obtain powder made up of granules having sizes from a lower limit of 120 μm to an upper limit of 550 μm.

13. The method claimed in claim 2, wherein the silica granules obtained by fractionation are screened to obtain powder made up of granules having sizes from a lower limit of 120 μm to an upper limit of 280 μm.

14. The method claimed in claim 10, wherein the screened silica powder is made up of granules having sizes from a lower limit of 75 μm to an upper limit of 280 μm.

15. The method claimed in claim 10, wherein the screened silica powder is made up of granules having sizes from a lower limit of 120 μm to an upper limit of 550 μm.

16. The method claimed in claim 10, wherein the screened silica powder is made up of granules having sizes from a lower limit of 120 μm to an upper limit of 280 μm.

17. The method claimed in claim 1, wherein the silica-based raw material includes at least about 98%, based on the total amount of silica-based raw material, of particles containing chlorine.

* * * * *